US011808690B2

(12) United States Patent
Lin et al.

(10) Patent No.: US 11,808,690 B2
(45) Date of Patent: *Nov. 7, 2023

(54) PHASE-CORRECTION OF RADIOFREQUENCY-MULTIPLEXED SIGNALS

(71) Applicant: Becton, Dickinson and Company, Franklin Lakes, NJ (US)

(72) Inventors: Jonathan Lin, San Gabriel, CA (US); Keegan Owsley, Campbell, CA (US); Matthew Bahr, San Jose, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/095,908

(22) Filed: Jan. 11, 2023

(65) Prior Publication Data

US 2023/0144214 A1    May 11, 2023

Related U.S. Application Data

(63) Continuation of application No. 16/887,538, filed on May 29, 2020, now Pat. No. 11,579,071.

(Continued)

(51) Int. Cl.
  *G01N 15/14* (2006.01)
(52) U.S. Cl.
  CPC ..... *G01N 15/1459* (2013.01); *G01N 15/1425* (2013.01); *G01N 15/1429* (2013.01);
  (Continued)
(58) Field of Classification Search
  CPC ........... G01N 15/1459; G01N 15/1429; G01N 2015/1402; G01N 2015/1454; G01N 2015/149
  See application file for complete search history.

(56) References Cited

U.S. PATENT DOCUMENTS 8,330,124 B2    12/2012    Doi
9,423,353 B2    8/2016    Diebold et al.
(Continued)

FOREIGN PATENT DOCUMENTS

EP        1945094 B1    9/2018
WO    WO2020231632 A1    11/2020

OTHER PUBLICATIONS

Digman, et al., "The Phasor Approach to Fluorescence Lifetime Imaging Analysis", Biophysical Journal: Biophysical etters, vol. 94, Issue 2, 15, 2008, pp. L14-L16.

*Primary Examiner* — Michael McCullough
*Assistant Examiner* — Jessica L Burkman
(74) *Attorney, Agent, or Firm* — Bret E. Field; BOZICEVIC, FIELD & FRANCIS LLP

(57) ABSTRACT

Aspects of the present disclosure include methods for characterizing particles of a sample in a flow stream. Methods according to certain embodiments include generating frequency-encoded fluorescence data from a particle of a sample in a flow stream; and calculating phase-corrected spatial data of the particle by performing a transform of the frequency-encoded fluorescence data with a phase correction component. In certain embodiments, methods include generating an image of the particle in the flow stream based on the phase-corrected spatial data. Systems having a processor with memory operably coupled to the processor having instructions stored thereon, which when executed by the processor, cause the processor to calculate phase-corrected spatial data from frequency-encoded fluorescence data of a particle a flow stream are also described. Integrated circuit devices (e.g., field programmable gate arrays) having programming for practicing the subject methods are also provided.

20 Claims, 2 Drawing Sheets

Related U.S. Application Data

(60) Provisional application No. 62/854,875, filed on May 30, 2019.

(52) U.S. Cl.
CPC . *G01N 15/1434* (2013.01); *G01N 2015/1402* (2013.01); *G01N 2015/142* (2013.01); *G01N 2015/149* (2013.01); *G01N 2015/1486* (2013.01)

(56) References Cited

U.S. PATENT DOCUMENTS

| | | |
|---|---|---|
| 10,006,852 B2 | 6/2018 | Diebold et al. |
| 10,078,045 B2 | 9/2018 | Diebold et al. |
| 10,288,546 B2 | 5/2019 | Diebold et al. |
| 10,324,019 B2 | 6/2019 | Diebold et al. |
| 10,620,111 B2 | 4/2020 | Diebold et al. |
| 10,684,211 B2 | 6/2020 | Diebold et al. |
| 11,015,975 B2 | 5/2021 | Sterczewski |
| 11,369,331 B2 | 6/2022 | Schreiber |
| 2006/0146925 A1 | 7/2006 | Birru |
| 2011/0168917 A1 | 7/2011 | Doi et al. |
| 2015/0142333 A1 | 5/2015 | Diem et al. |
| 2016/0003730 A1 | 1/2016 | Schreuder et al. |
| 2017/0328826 A1 | 11/2017 | Diebold et al. |
| 2018/0275042 A1 | 9/2018 | Diebold et al. |
| 2020/0072727 A1 | 3/2020 | Lin et al. |
| 2020/0126639 A1 | 4/2020 | Lin et al. |
| 2020/0209064 A1 | 7/2020 | Owsley et al. |
| 2020/0209140 A1 | 7/2020 | Diebold et al. |
| 2020/0256784 A1 | 8/2020 | Diebold et al. |

PHASE-CORRECTION OF RADIOFREQUENCY-MULTIPLEXED SIGNALS

CROSS-REFERENCE TO RELATED APPLICATION

This application is a continuation of U.S. patent application Ser. No. 16/887,538 filed May 29, 2020, which claims priority benefit of U.S. Provisional Patent Application Ser. No. 62/854,875 filed May 30, 2019; the disclosures of which applications are incorporated by reference.

INTRODUCTION

The characterization of analytes in biological fluids has become an integral part of medical diagnoses and assessments of overall health and wellness of a patient. Detecting analytes in biological fluids, such as human blood or blood derived products, can provide results that may play a role in determining a treatment protocol of a patient having a variety of disease conditions.

Flow cytometry is a technique used to characterize and often times sort biological material, such as cells of a blood sample or particles of interest in another type of biological or chemical sample. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. To characterize the components of the flow stream, the flow stream is irradiated with light. Variations in the materials in the flow stream, such as morphologies or the presence of fluorescent labels, may cause variations in the observed light and these variations allow for characterization and separation.

To characterize the components in the flow stream, light must impinge on the flow stream and be collected. Light sources in flow cytometers can vary from broad spectrum lamps, light emitting diodes as well as single wavelength lasers. The light source is aligned with the flow stream and an optical response from the illuminated particles is collected and quantified.

SUMMARY

Aspects of the present disclosure include methods for characterizing particles of a sample in a flow stream. Methods according to certain embodiments include generating frequency-encoded fluorescence data from a particle of a sample in a flow stream and calculating phase-corrected spatial data of the particle by performing a transform of the frequency-encoded fluorescence data with a phase correction component. In certain embodiments, methods include generating an image of the particle in the flow stream based on the phase-corrected spatial data. Systems having a processor with memory operably coupled to the processor having instructions stored thereon, which when executed by the processor, cause the processor to calculate phase-corrected spatial data from frequency-encoded fluorescence data of a particle a flow stream are also described. Integrated circuit devices (e.g., field programmable gate arrays) having programming for practicing the subject methods are also provided.

In embodiments, frequency-encoded fluorescence data from a particle in a sample is generated from light detected in an interrogation region of the flow stream. In some embodiments, the particle is a cell. In embodiments, methods include detecting light emission (e.g., fluorescence) from the sample in the flow stream to generate the frequency-encoded fluorescence data from the particle. In some embodiments, methods further include detecting light absorption, light scatter or a combination thereof. In some embodiments, the particle having one or more fluorophores is irradiated with a plurality of frequency shifted beams of light from a light beam generator to generate frequency-encoded fluorescence. In one example, a plurality of positions across (a horizontal axis) the flow stream are irradiated by a laser beam that includes a local oscillator beam and a plurality of radiofrequency-shifted laser beams such that different locations across the flow stream are irradiated by the local oscillator beam and one of the radiofrequency-shifted beams. In some instances, the local oscillator is a frequency-shifted beam of light from a laser. In this example, each spatial location across the particle in the flow stream is characterized by a different beat frequency which corresponds to the difference between the frequency of the local oscillator beam and the frequency of the radiofrequency-shifted beam at that location. In some embodiments, frequency-encoded data from the particle includes spatially encoded beat frequencies across a horizontal axis of the particle in the flow stream.

In practicing the subject methods, light from the sample in a flow stream is detected in an interrogation region and frequency encoded data from a particle in the sample is generated. In some embodiments, the particles detected in the interrogation region include cells. In some embodiments, methods include detecting one or more of light absorption, light scatter, light emission (e.g., fluorescence) from the sample in the flow stream. In some instances, phase-corrected spatial data of one or more particles in the sample is generated from detected light absorption (e.g., brightfield image data). In other instances, phase-corrected spatial data of one or more particles in the sample is generated from detected light scatter (e.g., forward scatter image data, side scatter image data). In yet other instances, phase-corrected spatial data of one or more particles in the sample are generated from detected fluorescence (e.g., fluorescent marker image data). In still other instances, phase-corrected spatial data of one or more particles in the sample is generated from a combination of two or more of detected light absorption, detected light scatter and detected fluorescence.

In embodiments, the frequency-encoded fluorescence data from the particle in the flow stream is transformed with a phase correction component to give spatial data of the particle. In embodiments, the spatial data may include the horizontal size dimensions of the particle, the vertical size dimensions of the particle, the ratio of particle size along two different dimensions, the ratio size of particle components (e.g., the ratio of horizontal dimension of the nucleus to horizontal dimension of the cytoplasm of a cell). In some embodiments, the frequency-encoded fluorescence data is transformed by a Fourier transform of the frequency-encoded fluorescence data with the phase correction component. In some instances, the frequency-encoded fluorescence data is transformed by a discrete Fourier transform (DFT) of the frequency-encoded fluorescence data with the phase correction component. In other instances, the phase-corrected spatial data is calculated by performing a short time Fourier transform (STFT) of the frequency-encoded fluorescence data with the phase correction. In still other instances, the phase-corrected spatial data is calculated with a digital lock-in amplifier to heterodyne and de-multiplex the frequency-encoded fluorescence data.

In some embodiments, methods include determining a phase correction component that is used to transform the frequency-encoded fluorescence data into the phase-corrected spatial data. In some instances, the phase correction component includes modified transform coefficients. In certain embodiments, the phase correction component includes a first phase adjustment and a second phase adjustment. In some instances, the first phase adjustment includes an output signal from the light detection system. For example, the first phase adjustment may include an output signal from a brightfield photodetector.

In some embodiments, the first phase adjustment is calculated by: multiplying an output signal from the brightfield photodetector with a predetermined constant signal to produce a phase adjustment value; and calculating the arctangent of the phase adjustment value to generate the first phase adjustment. In these embodiments, the phase adjustment value is a sum of all bins in a discrete Fourier transform of the frequency-encoded fluorescence data. In certain embodiments, the first phase adjustment is an interferometric phase adjustment. In these embodiments, the phase adjustment includes a phase shift caused by the light source used to irradiate the sample in the flow stream. For example, the light source may be a light beam generator component configured to generate at least a first beam of frequency shifted light and a second beam of frequency shifted light. The light beam generator according to certain instances includes a laser (e.g., a continuous wave laser) and an acousto-optic deflector (e.g., coupled to a direct digital synthesizer RF comb generator). In some embodiments, the interferometric phase adjustment includes a phase shift resulting from vibrations between components of the light beam generator. In some embodiments, the second phase adjustment is based on a fluorescence lifetime of a fluorophore in the sample. In these embodiments, the second phase adjustment may be calculated by taking the signal from all fluorescence detectors to determine the phases present in the signal and calculate the second phase adjustment from the fluorescence lifetime of the fluorophore.

Methods according to certain embodiments also include sorting one or more particles in the sample. In some embodiments, the particle is identified as being a single cell and is sorted to a first sample component collection location. In other embodiments, the particle is identified as being a cell aggregate and is sorted to a second sample component collection location. In some instances, the first sample component collection location includes a sample collection container and the second sample component collection location includes a waste collection container.

Aspects of the present disclosure also include systems for characterizing particles of a sample in a flow stream (e.g., cells in a biological sample). Systems according to certain embodiments include a light source configured to irradiate a sample having particles in a flow stream, a light detection system having a photodetector and a processor having memory operably coupled to the processor where the memory includes instructions stored thereon, which when executed by the processor, cause the processor to: generate frequency-encoded fluorescence data from a particle in the flow stream; and calculate phased-corrected spatial data of the particle by performing a transform of the frequency-encoded fluorescence data with a phase correction component.

In embodiments, systems are configured to generate frequency-encoded fluorescence data from a particle in a sample that is irradiated with the light source. In some embodiments, the light source includes a light beam generator component configured to generate at least a first beam of frequency shifted light and a second beam of frequency shifted light. The light beam generator according to certain instances includes a laser (e.g., a continuous wave laser) and an acousto-optic deflector (e.g., coupled to a direct digital synthesizer RF comb generator). The subject systems include a light detection system configured to detect one or more of light absorption, light scatter, light emission (e.g., fluorescence) from the sample in the flow stream. In some instances, the light detection system includes a photodetector for detecting light absorption (e.g., a brightfield photodetector). In other instances, the light detection system includes a photodetector for detecting light scatter (e.g., forward scatter detector, side scatter detector). In yet other instances, the light detection system includes a photodetector for detecting fluorescence. In still other instances, the light detection system includes a combination of two or more of: a light absorption detector, a light scatter detector and an emitted (e.g., fluorescence) light detector.

In embodiments, the subject systems include a processor with memory operably coupled to the processor such that the memory includes instructions stored thereon, which when executed by the processor, cause the processor to calculate phased-corrected spatial data of the particle by performing a transform of the frequency-encoded fluorescence data with a phase correction component. In embodiments, the spatial data may include the horizontal size dimensions of the particle, the vertical size dimensions of the particle, the ratio of particle size along two different dimensions, the ratio size of particle components (e.g., the ratio of horizontal dimension of the nucleus to horizontal dimension of the cytoplasm of a cell). In some embodiments, to calculate the phase-corrected spatial data, systems are configured to perform a Fourier transform of the frequency-encoded fluorescence data with the phase correction component to generate the phase-corrected spatial data of the particle. In other embodiments, systems are configured to perform a discrete Fourier transform (DFT) of the frequency-encoded fluorescence data with the phase correction component to generate the phase-corrected spatial data of the particle. In yet other embodiments, systems are configured to perform a short time Fourier transform (STFT) of the frequency-encoded fluorescence data with the phase correction component. In still other embodiments, systems are configured to calculate the phase-corrected spatial data with a digital lock-in amplifier to heterodyne and de-multiplex the frequency-encoded fluorescence data.

In some embodiments, systems include a processor with memory operably coupled to the processor such that the memory includes instructions stored thereon, which when executed by the processor, cause the processor to determine a phase correction component that is used to transform the frequency-encoded fluorescence data into the phase-corrected spatial data. In some instances, the phase correction component includes modified transform coefficients. In some embodiments, systems are configured to determine the phase correction component by calculating a first phase adjustment and a second phase adjustment. In some instances, the first phase adjustment includes an output signal from the light detection system. For example, the first phase adjustment may include an output signal from a brightfield photodetector.

In some embodiments, systems include a processor with memory operably coupled to the processor such that the memory includes instructions stored thereon, which when executed by the processor, cause the processor to calculate the first phase adjustment by: multiplying an output signal from the brightfield photodetector with a predetermined constant signal to produce a phase adjustment value; and calculating the arctangent of the phase adjustment value to generate the first phase adjustment. In these embodiments, the phase adjustment value is a sum of all bins in a discrete Fourier transform of the frequency-encoded fluorescence data. In certain embodiments, the first phase adjustment is an interferometric phase adjustment. In other embodiments, systems include a processor with memory operably coupled to the processor such that the memory includes instructions stored thereon, which when executed by the processor, cause the processor to calculate the second phase adjustment based on a fluorescence lifetime of a fluorophore in the sample. In these embodiments, the second phase adjustment may be calculated by the subject systems by taking the signal from all fluorescence detectors to determine the phases present in the signal and calculating the second phase adjustment from the fluorescence lifetime of the fluorophore.

Systems of interest are, in certain instances, configured for sorting particles of a sample (e.g., a biological sample) in the flow stream. In some embodiments, systems further include a particle sorting component having a sample fluid delivery subsystem and a sheath fluid delivery subsystem that is in fluid communication with an inlet of the particle sorting component and one or more sample collection containers for receiving the sorted particle from the flow stream.

Aspects of the present disclosure also include integrated circuit devices programmed to: generate frequency-encoded fluorescence data from a particle in the flow stream; calculate phase-corrected spatial data of the particle by performing a transform of the frequency-encoded fluorescence data with a phase correction component. In some embodiments, integrated circuit devices are programmed to sort the particles, such as to a sample collection container or to a waste collection container. Integrated circuit devices of interest may include, in certain instances, a field programmable gate array (FPGA), an application specific integrated circuit (ASIC) or a complex programmable logic device (CPLD).

Integrated circuit devices according to certain embodiments are programmed to generate frequency-encoded fluorescence data from a particle in the flow stream. In some embodiments, the integrated circuit device is programmed to generate frequency-encoded fluorescence data from data signals from a light absorption detector (e.g., brightfield image data). In other embodiments, the integrated circuit device is programmed to generate frequency-encoded fluorescence data from data signals from a light scatter detector (e.g., forward scatter image data, side scatter image data). In yet other embodiments, the integrated circuit device is programmed to generate frequency-encoded fluorescence data from data signals from a light emission detector (e.g., fluorescent marker image data). In still other instances, the integrated circuit device is programmed to generate frequency-encoded fluorescence data from a combination of two or more of detected light absorption, detected light scatter and detected fluorescence.

In embodiments, the integrated circuit device is programmed to calculate phase-corrected spatial data of the particle by performing a transform of the frequency-encoded fluorescence data with a phase correction component. In some instances, the integrated circuit device is programmed to perform a Fourier transform of the frequency-encoded fluorescence data with the phase correction component to generate the phase-corrected spatial data of the particle. In other instances, the integrated circuit device is programmed to perform a discrete Fourier transform of the frequency-encoded fluorescence data with the phase correction component to generate the phase-corrected spatial data of the particle. In yet other instances, the integrated circuit device is programmed to perform a short time Fourier transform of the frequency-encoded fluorescence data with the phase correction component to generate the phase-corrected spatial data of the particle. In still other instances, the integrated circuit device is programmed to calculate the phase-corrected spatial data with a digital lock-in amplifier to heterodyne and de-multiplex the frequency-encoded fluorescence data.

In some embodiments, the integrated circuit device is programmed to determine a phase correction component that is used to transform the frequency-encoded fluorescence data into the phase-corrected spatial data. In some instances, the phase correction component includes modified transform coefficients. In some embodiments, the integrated circuit device is programmed to determine the phase correction component by calculating a first phase adjustment and a second phase adjustment. In some instances, the first phase adjustment includes an output signal from the light detection system. For example, the first phase adjustment may include an output signal from a brightfield photodetector.

In some embodiments, the integrated circuit device is programmed to calculate the first phase adjustment by: multiplying an output signal from the brightfield photodetector with a predetermined constant signal to produce a phase adjustment value; and calculating the arctangent of the phase adjustment value to generate the first phase adjustment. In these embodiments, the phase adjustment value is a sum of all bins in a discrete Fourier transform of the frequency-encoded fluorescence data. In certain embodiments, the first phase adjustment is an interferometric phase adjustment. In other embodiments, the integrated circuit device is programmed to calculate the second phase adjustment based on a fluorescence lifetime of a fluorophore in the sample. In these embodiments, the second phase adjustment may be calculated by the subject integrated circuit by taking the signal from all fluorescence detectors to determine the phases present in the signal and calculating the second phase adjustment from the fluorescence lifetime of the fluorophore.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1:
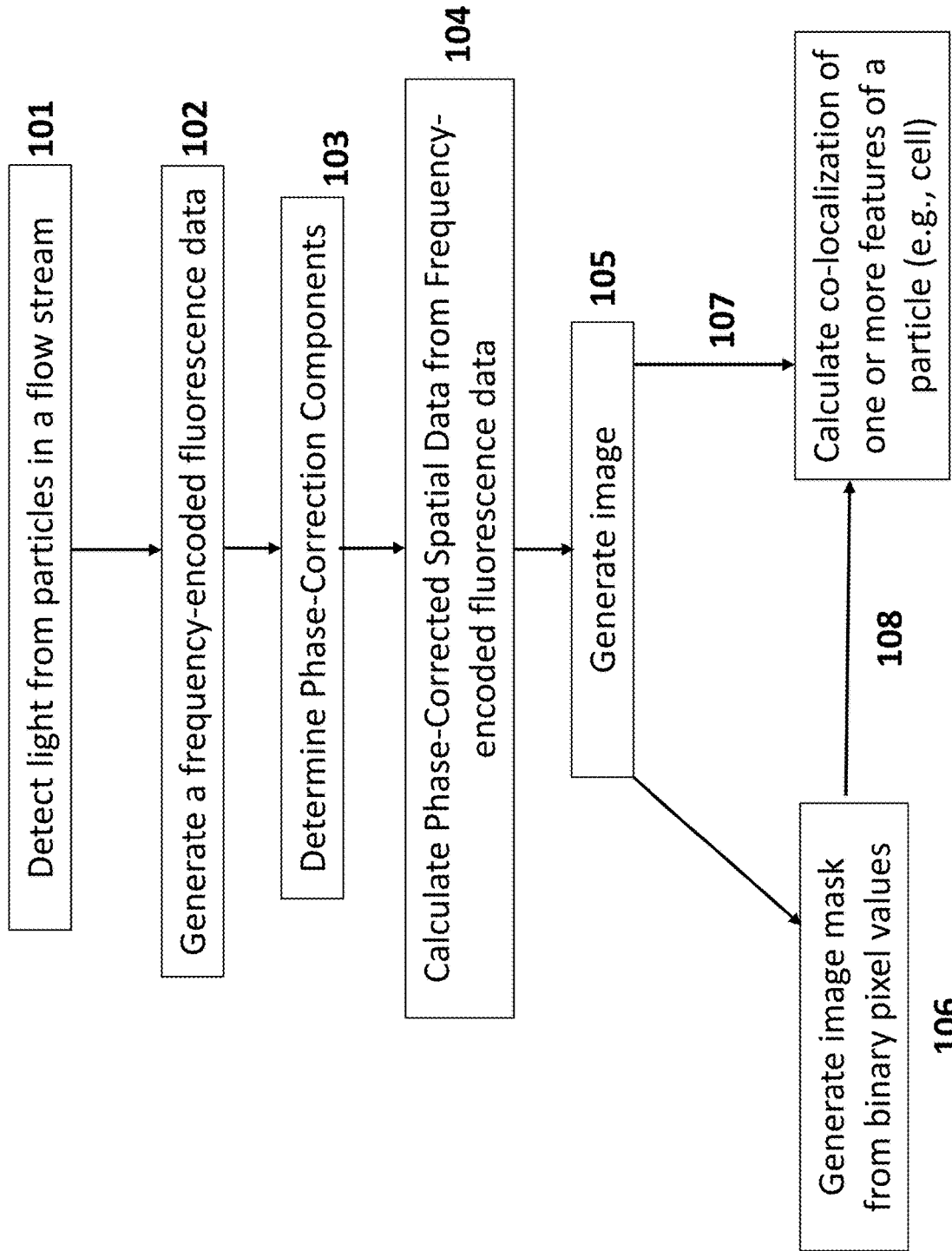
FIG. 1 depicts a flow chart for generating frequency-encoded fluorescence data and calculating phase-corrected spatial data from the frequency-encoded fluorescence data according to certain embodiments.

Aspects of the present disclosure include methods for characterizing particles of a sample in a flow stream. Methods according to certain embodiments include generating frequency-encoded fluorescence data from a particle of a sample in a flow stream; and calculating phase-corrected spatial data of the particle by performing a transform of the frequency-encoded fluorescence data with a phase correction component. In certain embodiments, methods include generating an image of the particle in the flow stream based on the phase-corrected spatial data. Systems having a processor with memory operably coupled to the processor having instructions stored thereon, which when executed by the processor, cause the processor to calculate phase-corrected spatial data from frequency-encoded fluorescence data of a particle a flow stream are also described. Integrated circuit devices (e.g., field programmable gate arrays) having programming for practicing the subject methods are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides systems and methods for characterizing (e.g., imaging) a particle of a sample in a flow stream. In further describing embodiments of the disclosure, methods for generating frequency-encoded fluorescence data from a particle of a sample in a flow stream and calculating phase-corrected spatial data of the particle are first described in greater detail. Next, systems for characterizing the particles in the flow stream and separating particles in a sample in real time are described. Integrated circuit devices, such as field programmable gate arrays having programming for generating frequency-encoded fluorescence data from a particle of a sample in a flow stream and calculating phase-corrected spatial data of the particle are also provided.

Methods for Characterizing Particles an a Sample

Aspects of the present disclosure include methods for characterizing particles of a sample (e.g., cells in a biological sample). In practicing methods according to certain embodiments, a sample having cells in a flow stream is irradiated with a light source and light from the sample is detected to generate frequency-encoded fluorescence data from a particle and calculating phase-corrected spatial data of the particle by performing a transform of the frequency-encoded fluorescence data with a phase correction component. In some embodiments, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In practicing the subject methods, a sample having particles (e.g., cells in a flow stream of a flow cytometer) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, super-luminescent emitting diode, semiconductor light emitting diode, wide spectrum LED white light source, an multi-LED integrated white light source, among other broadband light sources or any combination thereof.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the flow stream with one or more lasers. The type and number of lasers will vary depending on the sample as well as desired light collected and may be a pulsed laser or continuous wave laser. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof; a semiconductor diode laser, optically pumped semiconductor laser (OPSL), or a frequency doubled- or frequency tripled implementation of any of the above mentioned lasers.

The sample in the flow stream may be irradiated with one or more of the above-mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the sample in the flow stream with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In practicing the subject methods, light from the irradiated sample is measured, such as by collecting light from the sample over a range of wavelengths (e.g., 200 nm-1000 nm). In embodiments, methods may include one or more of measuring light absorption by the sample (e.g., brightfield light data), measuring light scatter (e.g., forward or side scatter light data) and measuring light emission by the sample (e.g., fluorescence light data).

Light from the sample may be measured at one or more wavelengths of, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring the collected light at 400 or more different wavelengths.

Light may be collected over one or more of the wavelength ranges of 200 nm-1200 nm. In some instances, methods include measuring the light from the sample over a range of wavelengths, such as from 200 nm to 1200 nm, such as from 300 nm to 1100 nm, such as from 400 nm to 1000 nm, such as from 500 nm to 900 nm and including from 600 nm to 800 nm. In other instances, methods include measuring collected light at one or more specific wavelengths. For example, the collected light may be measured at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, methods including measuring wavelengths of light which correspond to the fluorescence peak wavelength of certain fluorophores.

The collected light may be measured continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the collected light may be taken one or more times during the subject methods, such as 2 or more times, such as 3 or more times, such as 5 or more times and including 10 or more times. In certain embodiments, light from the sample is measured 2 or more times, with the data in certain instances being averaged.

In some embodiments, methods include further adjusting the light from the sample before detecting the light. For example, the light from the sample source may be passed through one or more lenses, mirrors, pinholes, slits, gratings, light refractors, and any combination thereof. In some instances, the collected light is passed through one or more focusing lenses, such as to reduce the profile of the light. In other instances, the emitted light from the sample is passed through one or more collimators to reduce light beam divergence.

In certain embodiments, methods include irradiating the sample with two or more beams of frequency shifted light. As described above, a light beam generator component may be employed having a laser and an acousto-optic device for frequency shifting the laser light. In these embodiments, methods include irradiating the acousto-optic device with the laser. Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The acousto-optic device may be irradiated with one or more lasers, such as 2 or more lasers, such as 3 or more lasers, such as 4 or more lasers, such as 5 or more lasers and including 10 or more lasers. The lasers may include any combination of types of lasers. For example, in some embodiments, the methods include irradiating the acousto-optic device with an array of lasers, such as an array having one or more gas lasers, one or more dye lasers and one or more solid-state lasers.

Where more than one laser is employed, the acousto-optic device may be irradiated with the lasers simultaneously or sequentially, or a combination thereof. For example, the acousto-optic device may be simultaneously irradiated with each of the lasers. In other embodiments, the acousto-optic device is sequentially irradiated with each of the lasers. Where more than one laser is employed to irradiate the acousto-optic device sequentially, the time each laser irradiates the acousto-optic device may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where the acousto-optic device is sequentially irradiated with two or more lasers, the duration the acousto-optic device is irradiated by each laser may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds. In embodiments where the acousto-optic device is sequentially irradiated by more than two (i.e., 3 or more) lasers, the delay between irradiation by each laser may be the same or different.

The acousto-optic device may be irradiated continuously or in discrete intervals. In some instances, methods include irradiating the acousto-optic device with the laser continuously. In other instances, the acousto-optic device is irradiated with the laser in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the laser, the acousto-optic device may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In embodiments, methods include applying radiofrequency drive signals to the acousto-optic device to generate angularly deflected laser beams. Two or more radiofrequency drive signals may be applied to the acousto-optic device to generate an output laser beam with the desired number of angularly deflected laser beams, such as 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including 100 or more radiofrequency drive signals.

The angularly deflected laser beams produced by the radiofrequency drive signals each have an intensity based on the amplitude of the applied radiofrequency drive signal. In some embodiments, methods include applying radiofrequency drive signals having amplitudes sufficient to produce angularly deflected laser beams with a desired intensity. In some instances, each applied radiofrequency drive signal independently has an amplitude from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In some embodiments, to generate the frequency-encoded fluorescence data, the sample in the flow stream is irradiated with an output laser beam from an acousto-optic device that includes angularly deflected laser beams each having an intensity based on the amplitude of the applied radiofrequency drive signal. For example, the output laser beam used to irradiate the particle in the flow stream may include 2 or more angularly deflected laser beams, such as 3 or more, such as 4 or more, such as 5 or more, such as 6 or more, such as 7 or more, such as 8 or more, such as 9 or more, such as 10 or more and including 25 or more angularly deflected laser beams. In embodiments, each of the angularly deflected laser beams have different frequencies which are shifted from frequency of the input laser beam by a predetermined radiofrequency.

Each angularly deflected laser beam is also spatially shifted from each other. Depending on the applied radiofrequency drive signals and desired irradiation profile of the output laser beam, the angularly deflected laser beams may be separated by 0.001 μm or more, such as by 0.005 μm or more, such as by 0.01 μm or more, such as by 0.05 μm or more, such as by 0.1 μm or more, such as by 0.5 μm or more, such as by 1 μm or more, such as by 5 μm or more, such as by 10 μm or more, such as by 100 μm or more, such as by 500 μm or more, such as by 1000 μm or more and including by 5000 μm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 μm or more, such as an overlap of 0.005 μm or more, such as an overlap of 0.01 μm or more, such as an overlap of 0.05 μm or more, such as an overlap of 0.1 μm or more, such as an overlap of 0.5 μm or more, such as an overlap of 1 μm or more, such as an overlap of 5 μm or more, such as an overlap of 10 μm or more and including an overlap of 100 μm or more.

As a particle passes through a portion of the excitation beam formed by superposition of two beamlets, it is exposed to a superposition of their electric fields. The fluorescence emitted by the particle is frequency encoded with a beat frequency that corresponds to a difference between the optical frequencies of the incident beamlets. By way of example, the frequency-encoded fluorescence emitted by a particle passing through a left horizontal edge of an excitation beam, which is formed via a superposition of a first beamlet and a second beamlet, would exhibit a beat frequency corresponding to the difference between the frequencies of the second beamlet and first beamlet, i.e., a beat frequency of $f_{first\ beamlet} - f_{second\ beamlet}$. In this manner, the positions of the particles passing through the excitation beam can be encoded through the RF beat frequencies associated with the radiation emitted by those particles. In some embodiments, such encoding of the positions of the particles can be used to normalize the intensity of the detected radiation emitted by those particles relative to the variation of the beam intensity, e.g., across its horizontal direction.

In some embodiments, the frequency-encoded fluorescence emitted by a particle is the beat frequency corresponding to the difference between the frequency of a local oscillator beam ($f_{LO}$) and the frequency of a radiofrequency shifted beamlet. For example, the frequency-encoded fluorescence data includes a beat frequency of $f_{LO} - f_{RF\ shifted\ beamlet}$. Where irradiation of the flow stream includes a local oscillator which spans a width (e.g., the entire horizontal axis) of the flow stream, the frequency-encoded fluorescence data includes beat frequencies corresponding to the difference between the frequency of the local oscillator beam ($f_{LO}$) and the frequency of each radiofrequency shifted beamlet ($f_1$, $f_2$, $f_3$, $f_4$, $f_5$, $f_6$, etc.). In these embodiments, the frequency-encoded fluorescence data may include a plurality of beat frequencies each corresponding to a location across the horizontal axis of the flow stream.

As discussed in greater detail below, in one operational mode, a particle in the flow stream can be illuminated concurrently with a plurality of excitation frequencies, each of which can be obtained, e.g., by shifting the central frequency of a laser beam. More specifically, a plurality of sample locations can be concurrently illuminated by a laser beam that is generated by mixing a reference laser beam (e.g., a local oscillator) with a plurality of radiofrequency-shifted laser beams such that each sample location is illuminated by the reference beam and one of the radiofrequency-shifted beams to excite a fluorophore of interest at that location, if present. In some embodiments, the reference local oscillator can be generated via radiofrequency shifting of a beam of light (e.g., from a laser, such as a continuous wave laser). In these embodiments, each spatial location of the particle in the flow stream that is irradiated with the light is "tagged" with a different beat frequency corresponding to a difference between the frequency of the reference beam and that of one of the radiofrequency shifted beams. In these instances, the fluorescence radiation emitted by the fluorophore will spatially encode the beat frequencies.

In certain instances, the flow stream is irradiated with a plurality of beams of frequency-shifted light and a cell in the flow stream is imaged by fluorescence imaging using radiofrequency tagged emission (FIRE) to generate a frequency-encoded image, such as those described in Diebold, et al. *Nature Photonics* Vol. 7(10); 806-810 (2013) as well as described in U.S. Pat. Nos. 9,423,353; 9,784,661 and 10,006,852 and U.S. Patent Publication Nos. 2017/0133857 and 2017/0350803, the disclosures of which are herein incorporated by reference.

In embodiments, the frequency-encoded fluorescence data is generated by detecting the light from the particle in the flow stream. The fluorescence data may be generated from one or more fluorescence light detectors (e.g., one or more detection channels), such as 2 or more, such as 3 or more, such as 4 or more, such as 5 or more, such as 6 or more and including 8 or more fluorescence light detectors (e.g., 8 or more detection channels). In some embodiments, the frequency-encoded fluorescence data includes data components taken (or derived) from light from other detectors, such as detected light absorption or detected light scatter. In some instances, one or more data components of the frequency-encoded fluorescence data from the sample is generated from light absorption detected from the sample, such as from a brightfield light detector. As described in greater detail below, the phase correction component may include signals from a brightfield detector which is, in certain embodiments, used to generate a phase-corrected spatial data which accounts for an interferometric phase adjustment to the spatial data calculated from frequency-encoded fluorescence data. In other instances, one or more data components of the frequency-encoded fluorescence data from the sample is generated from light scatter detected from the sample, such as from a side scatter detector, a forward scatter detector or a combination of a side scatter detector and forward scatter detector.

In embodiments, methods include calculating spatial data from the frequency-encoded fluorescence data. The spatial data according to embodiments of the disclosure is phase-corrected by performing a transform of the frequency-encoded fluorescence data with a phase correction component. In some embodiments, the spatial data includes horizontal size dimensions of the particle, vertical size dimensions of the particle, ratio of particle size along two different dimensions, ratio size of particle components (e.g., the ratio of horizontal dimension of the nucleus to horizontal dimension of the cytoplasm of a cell).

In some instances, the phase correction component is used to generate modified transform coefficients (i.e., for transforming the frequency-encoded data into spatial data, described below). For example, the phase correction component may include 2 or more modified transform coefficients, such as 3 or more, such as 4 or more and including 5 or more modified transform coefficients. Where the spatial data is calculated by performing a Fourier transform (as described below), in certain embodiments, the phase correction component includes modified transform coefficient where the Fourier transform generates only real mathematical computational components (i.e., no imaginary mathematical computation components are generated)

In certain embodiments, the phase correction component includes a first phase adjustment and a second phase adjustment. Each phase adjustment may be a result of a different source of phase in the frequency-encoded fluorescence data. In one example, the first phase adjustment includes an output signal from the light detection system. For example, the first phase adjustment may include an output signal from a brightfield photodetector. In some embodiments, the first phase adjustment is calculated by: multiplying an output signal from the brightfield photodetector with a predetermined constant signal to produce a phase adjustment value; and calculating the arctangent of the phase adjustment value to generate the first phase adjustment. In these embodiments, the phase adjustment value is a sum of all bins in a discrete Fourier transform of the frequency-encoded fluorescence data.

In certain embodiments, the first phase adjustment is an interferometric phase adjustment. In these embodiments, the phase adjustment includes a phase shift caused by the light source used to irradiate the sample in the flow stream. For example, the light source may be a light beam generator component configured to generate at least a first beam of frequency shifted light and a second beam of frequency shifted light. The light beam generator according to certain instances includes a laser (e.g., a continuous wave laser) and an acousto-optic deflector (e.g., coupled to a direct digital synthesizer RF comb generator). In some embodiments, the interferometric phase adjustment includes a phase shift resulting from vibrations between components of the light beam generator.

In some embodiments, the second phase adjustment is based on a fluorescence lifetime of a fluorophore in the sample. In these embodiments, the second phase adjustment may be calculated by taking the signal from all fluorescence detectors to determine the phases present in the signal and calculate the second phase adjustment from the fluorescence lifetime of the fluorophore. Depending on the specific type of fluorophore and number of fluorophores present, one or more fluorescence lifetimes may be calculated, such as 2 or more, such as 3 or more, such as 4 or more and including 5 or more fluorescence lifetimes may be calculated. In some embodiments, each fluorescent lifetime is calculated at the fluorophore peak emission wavelength. In these embodiments, each fluorophore lifetime may be detected and calculated using a signal from a different detector channel.

In embodiments, methods also include calculating phase-corrected spatial data by performing a transform of the frequency-encoded fluorescence data with the determined phase correction component above. In some embodiments, methods include calculating the spatial data from frequency-encoded fluorescence data from the object. In some instances, calculating the spatial data of the object includes performing a transform of the frequency-encoded fluorescence data. In one example, the spatial data is calculated by performing a Fourier transform (FT) of the frequency-encoded fluorescence data. In another example, the spatial data is calculated by performing a discrete Fourier transform (DFT) of the frequency-encoded fluorescence data. In yet another example, the spatial data is calculated by performing a short time Fourier transform (STFT) of the frequency-encoded fluorescence data. In still another example, the spatial data is calculated with a digital lock-in amplifier to heterodyne and de-multiplex the frequency-encoded fluorescence data. By taking into account the phase correction component before performing a transform of the frequency-encoded data into spatial data, the output of the transform is less computationally complex as compared to performing a transform of the raw frequency data into spatial data (i.e., without first accounting for phase) In some embodiments, methods include performing a transform of the frequency-encoded fluorescence data without performing any mathematical imaginary computations (i.e., only performing computations for mathematical real computations of the transform) to generate spatial data from the frequency-encoded fluorescence data.

In some embodiments, methods include generating an image of a particle in the flow stream from the frequency-encoded fluorescence. In some embodiments, the image of the particle may be generated from the frequency-encoded fluorescence in combination with detected light absorption, detected light scatter or a combination thereof. In certain instances, the image of the particle is generated from only the frequency-encoded fluorescence. In other instances, the image of the object is generated from the frequency-encoded fluorescence and light absorption detected from the sample, such as from a brightfield light detector. In yet other instances, the image of the particle is generated from the frequency-encoded fluorescence with light scatter detected from the sample, such as from a side scatter detector, a forward scatter detector or a combination of a side scatter detector and forward scatter detector. In still other instances, the image of the particle is generated from the frequency-encoded fluorescence and a combination of detected light absorption, detected light scatter and detected light emission.

One or more images of the particle may be generated from the frequency-encoded fluorescence data. In some embodiments, a single image of the particle is generated from the frequency-encoded fluorescence data. In other embodiments, two or more images of the particle are generated from the frequency-encoded fluorescence data, such as 3 or more, such as 4 or more, such as 5 or more and including 10 or more images or a combination thereof.

As summarized above, methods of the present disclosure also include sorting the particle. In embodiments, the particle may be sorted based on the frequency-encoded fluorescence data, the calculated spatial data, generated image, one or more determined properties of the particle (e.g., size, center of mass, eccentricity) determined from the calculated spatial data or the generated image or some combination thereof. The term "sorting" is used herein in its conventional sense to refer to separating components (e.g., droplets containing cells, droplets containing non-cellular particles such as biological macromolecules) of a sample and in some instances, delivering the separated components to one or more sample collection containers. For example, methods may include sorting 2 or more components of the sample, such as 3 or more components, such as 4 or more components, such as 5 or more components, such as 10 or more components, such as 15 or more components and including sorting 25 or more components of the sample. In some instances, a first sample component collection location includes a sample collection container and the second sample component collection location includes a waste collection container.

In sorting particles from the sample in the flow stream, methods include data acquisition (e.g., fluorescence data), analysis (determining frequency-encoded fluorescence data, determining phase correction components, calculating a transform of the frequency-encoded data into phase-corrected spatial data) and recording, such as with a computer, where multiple data channels record data from each detector (e.g., scatter detectors, brightfield photodetectors or fluorescence detectors). In these embodiments, analysis includes classifying and counting particles such that each particle is present as a set of digitized parameter values. The subject systems (described below) may be set to trigger on a selected parameter in order to distinguish the particles of interest from background and noise.

A particular subpopulation of interest (e.g., single cells) may then further analyzed by "gating" based on the frequency-encoded fluorescence data collected for the entire population. To select an appropriate gate, the data is plotted so as to obtain the best separation of subpopulations possible. This procedure may be performed by plotting image moment or one or more of the determined properties (e.g., size, center of mass, eccentricity). In other embodiments, methods include plotting forward light scatter (FSC) vs. side (i.e., orthogonal) light scatter (SSC) on a two-dimensional dot plot. In yet other embodiments, methods include plotting one or more of the determined properties (e.g., size, center of mass, eccentricity) against one or more of forward light scatter (FSC) and side (i.e., orthogonal) light scatter (SSC). In still other embodiments, methods include gating the population of particles for forward light scatter (FSC) and side (i.e., orthogonal) light scatter (SSC), followed by gating based on one or more of the determined properties (e.g., size, center of mass, eccentricity) based on the image of the object. In still other embodiments, methods include gating the population of particles based on one or more of the determined properties (e.g., size, center of mass, eccentricity) based on the image of the object, followed by gating the population of particles for forward light scatter (FSC) and side (i.e., orthogonal) light scatter (SSC).

A subpopulation of objects is then selected (i.e., those single cells within the gate) and particles that are not within the gate are excluded. Where desired, the gate may be selected by drawing a line around the desired subpopulation using a cursor on a computer screen. Only those particles within the gate are then further analyzed by plotting the other parameters for these particles, such as fluorescence. Where desired, the above analysis may be configured to yield counts of the particles of interest in the sample.

In some embodiments, methods for sorting components of sample include sorting particles (e.g., cells in a biological sample) with particle sorting module having deflector plates, such as described in U.S. Patent Publication No. 2017/0299493, filed on Mar. 28, 2017, the disclosure of which is incorporated herein by reference. In certain embodiments, cells of the sample are sorted using a sort decision module having a plurality of sort decision units, such as those described in U.S. Provisional Patent Application No. 62/803,264, filed on Feb. 8, 2019, the disclosure of which is incorporated herein by reference.

FIG. 1 depicts a flow chart for generating frequency-encoded fluorescence data and calculating phase-corrected spatial data from the frequency-encoded fluorescence data according to certain embodiments. At step 101, light (light absorption, scattered light or emission) from a particle (e.g., cell) in a flow stream are detected. At step 102, frequency-encoded fluorescence data (e.g., frequency data from each spatial location along the horizontal axis) of the particle is generated. At step 103, phase correction components, such as interferometric phase components and fluorescence lifetime phase components are determined. At step 104, phase-corrected spatial data is calculated by performing a transform of the frequency-encoded fluorescence data, such as with a discrete Fourier transform. The spatial data can be used to generate an image at step 105. The image mask can then be used to generate an image mask at step 106. Two or more images may be used calculate co-localization of one or more features of the cell (e.g., cellular organelles) at step 107 or co-localization may be calculated using the image mask at step 108.

Figure 2:
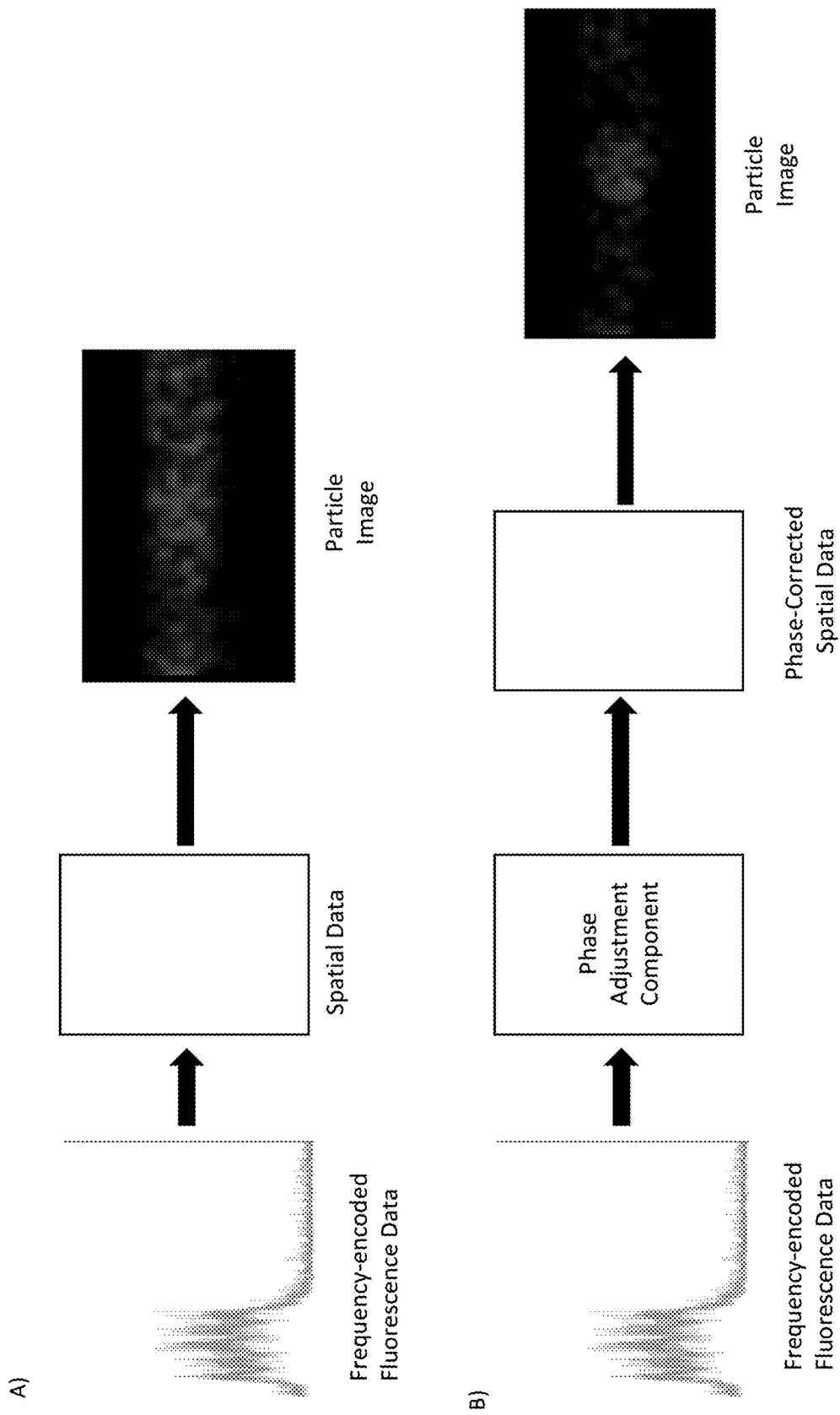
FIG. 2 depicts a comparison of generating an image of a particle using phase-corrected spatial data with an image where the spatial data is not phase-corrected according to embodiments.

FIG. 2 depicts a comparison of generating an image of a particle using phase-corrected spatial data with an image where the spatial data is not phase-corrected according to certain embodiments. As shown in panel A, frequency-encoded fluorescence data is transformed into spatial data, for example, by using a Fast Fourier transform (FFT) without phase correction. The generated image shows poor resolution with the particle being obscured by background noise. In panel B, the frequency encoded fluorescence data is phase corrected with a phase adjustment component in conjunction with FFT to generate phase-corrected spatial data. The phase-corrected spatial data provides for enhanced resolution particle imaging which is not obscured by background noise.

Systems for Characterizing Particles in a Sample

As summarized above, aspects of the present disclosure include a system for characterizing particles of a sample (e.g., cells in a biological sample). Systems according to certain embodiments include a light source configured to irradiate a sample having particles in a flow stream, a light detection system having a photodetector and a processor having memory operably coupled to the processor where the memory includes instructions stored thereon, which when executed by the processor, cause the processor to: generate frequency-encoded fluorescence data from a particle in the flow stream; and calculate phased-corrected spatial data of the particle by performing a transform of the frequency-encoded fluorescence data with a phase correction component.

Systems of interest include a light source configured to irradiate a sample in a flow stream. In embodiments, the light source may be any suitable broadband or narrow band source of light. Depending on the components in the sample (e.g., cells, beads, non-cellular particles, etc.), the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a narrow band light source emitting a wavelength ranging from 200 nm to 900 nm. For example, the light source may be a narrow band LED (1 nm-25 nm) emitting light having a wavelength ranging between 200 nm to 900 nm.

In some embodiments, the light source is a laser. Lasers of interest may include pulsed lasers or continuous wave lasers. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof; a semiconductor diode laser, optically pumped semiconductor laser (OPSL), or a frequency doubled- or frequency tripled implementation of any of the above mentioned lasers.

In other embodiments, the light source is a non-laser light source, such as a lamp, including but not limited to a halogen lamp, deuterium arc lamp, xenon arc lamp, a light-emitting diode, such as a broadband LED with continuous spectrum, superluminescent emitting diode, semiconductor light emitting diode, wide spectrum LED white light source, an multi-LED integrated. In some instances the non-laser light source is a stabilized fiber-coupled broadband light source, white light source, among other light sources or any combination thereof.

In certain embodiments, the light source is a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser. For example lasers in light beam generators of interest may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory may include instructions to produce 100 or more angularly deflected laser beams with the same intensities. In other embodiments, the may include instructions to produce two or more angularly deflected laser beams with different intensities, such as 3 or more, such as 4 or more, such as 5 or more, such as 10 or more, such as 25 or more, such as 50 or more and including memory may include instructions to produce 100 or more angularly deflected laser beams with different intensities.

In certain embodiments, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other embodiments, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other embodiments, the controller has a processor having memory operably coupled to the processor such that the memory includes instructions stored thereon, which when executed by the processor, cause the processor to produce an output laser beam having an intensity profile with a Gaussian distribution along the horizontal axis. In still other embodiments, the controller has a processor having memory operably coupled to the processor such that the memory includes instructions stored thereon, which when executed by the processor, cause the processor to produce an output laser beam having a top hat intensity profile along the horizontal axis.

In embodiments, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, light beam generators configured to generate two or more beams of frequency shifted light include laser excitation modules as described in U.S. Pat. Nos. 9,423,353; 9,784,661 and 10,006,852 and U.S. Patent Publication Nos. 2017/0133857 and 2017/0350803, the disclosures of which are herein incorporated by reference.

In embodiments, systems include a light detection system having one or more photodetectors for detecting and measuring light from the sample. Photodetectors of interest may be configured to measure light absorption (e.g., for brightfield light data), light scatter (e.g., forward or side scatter light data), light emission (e.g., fluorescence light data) from the sample or a combination thereof. Photodetectors of interest may include, but are not limited to optical sensors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light from a sample is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors.

In some embodiments, light detection systems of interest include a plurality of photodetectors. In some instances, the light detection system includes a plurality of solid-state detectors such as photodiodes. In certain instances, the light detection system includes a photodetector array, such as an array of photodiodes. In these embodiments, the photodetector array may include 4 or more photodetectors, such as 10 or more photodetectors, such as 25 or more photodetectors, such as 50 or more photodetectors, such as 100 or more photodetectors, such as 250 or more photodetectors, such as 500 or more photodetectors, such as 750 or more photodetectors and including 1000 or more photodetectors. For example, the detector may be a photodiode array having 4 or more photodiodes, such as 10 or more photodiodes, such as 25 or more photodiodes, such as 50 or more photodiodes, such as 100 or more photodiodes, such as 250 or more photodiodes, such as 500 or more photodiodes, such as 750 or more photodiodes and including 1000 or more photodiodes.

The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The photodetectors in the photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The photodetector array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain embodiments, the photodetector array has a rectangular-shaped active surface.

Each photodetector (e.g., photodiode) in the array may have an active surface with a width that ranges from 5 µm to 250 µm, such as from 10 µm to 225 µm, such as from 15 µm to 200 µm, such as from 20 µm to 175 µm, such as from 25 µm to 150 µm, such as from 30 µm to 125 µm and including from 50 µm to 100 µm and a length that ranges from 5 µm to 250 µm, such as from 10 µm to 225 µm, such as from 15 µm to 200 µm, such as from 20 µm to 175 µm, such as from 25 µm to 150 µm, such as from 30 µm to 125 µm and including from 50 µm to 100 µm, where the surface area of each photodetector (e.g., photodiode) in the array ranges from 25 $µm^2$ to 10000 $µm^2$, such as from 50 $µm^2$ to 9000 $µm^2$, such as from 75 $µm^2$ to 8000 $µm^2$, such as from 100 $µm^2$ to 7000 $µm^2$, such as from 150 $µm^2$ to 6000 $µm^2$ and including from 200 $µm^2$ to 5000 $µm^2$.

The size of the photodetector array may vary depending on the amount and intensity of the light, the number of photodetectors and the desired sensitivity and may have a length that ranges from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. The width of the photodetector array may also vary, ranging from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. As such, the active surface of the photodetector array may range from 0.1 $mm^2$ to 10000 $mm^2$, such as from 0.5 $mm^2$ to 5000 $mm^2$, such as from 1 $mm^2$ to 1000 $mm^2$, such as from 5 $mm^2$ to 500 $mm^2$, and including from 10 $mm^2$ to 100 $mm^2$.

Photodetectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In some embodiments, photodetectors are configured to measure collected light over a range of wavelengths (e.g., 200 nm-1000 nm). In certain embodiments, photodetectors of interest are configured to collect spectra of light over a range of wavelengths. For example, systems may include one or more detectors configured to collect spectra of light over one or more of the wavelength ranges of 200 nm-1000 nm. In yet other embodiments, detectors of interest are configured to measure light from the sample in the flow stream at one or more specific wavelengths. For example, systems may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof.

The light detection system is configured to measure light continuously or in discrete intervals. In some instances, photodetectors of interest are configured to take measurements of the collected light continuously. In other instances, the light detection system is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In embodiments, systems are configured to generate frequency-encoded fluorescence data by irradiating a sample having particles in a flow stream. In some embodiments, the light source includes a light generator component that generates a plurality of angularly deflected laser beams each having an intensity based on the amplitude of an applied radiofrequency drive signal (e.g., from a direct digital synthesizer coupled to an acousto-optic device). For example, the subject systems may include light generator component that generates 2 or more angularly deflected laser beams, such as 3 or more, such as 4 or more, such as 5 or more, such as 6 or more, such as 7 or more, such as 8 or more, such as 9 or more, such as 10 or more and including 25 or more angularly deflected laser beams. In embodiments, each of the angularly deflected laser beams have different frequencies which are shifted from frequency of the input laser beam by a predetermined radiofrequency.

The subject systems are, according to certain embodiments, configured to generate angularly deflected laser beam that are also spatially shifted from each other. Depending on the applied radiofrequency drive signals and desired irradiation profile of the output laser beam, the subject systems may be configured to generate angularly deflected laser beams that are separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In some embodiments, systems include a processor having memory operably coupled to the processor where the memory includes instructions stored thereon, which when executed by the processor, cause the processor to generate frequency-encoded fluorescence data by calculating a difference between the optical frequencies of the incident overlapping beamlets of light on the flow stream. In one example, systems include a processor having memory operably coupled to the processor where the memory includes instructions stored thereon, which when executed by the processor, cause the processor to calculate a beat frequency at each location across a horizontal axis of the flow stream. In these embodiments, the frequency-encoded fluorescence emitted by a particle is the beat frequency corresponding to the difference between the frequency of a local oscillator beam ($f_{LO}$) and the frequency of a radiofrequency shifted beamlet. For example, the frequency-encoded fluorescence data includes a beat frequency of $f_{LO}-f_{RF\ shifted\ beamlet}$. Where irradiation of the flow stream includes a local oscillator which spans a width (e.g., the entire horizontal axis) of the flow stream, the frequency-encoded fluorescence data includes beat frequencies corresponding to the difference between the frequency of the local oscillator beam ($f_{LO}$) and the frequency of each radiofrequency shifted beamlet ($f_1$, $f_2$, $f_3$, $f_4$, $f_5$, $f_6$, etc.). In these embodiments, the frequency-encoded fluorescence data may include a plurality of beat frequencies each corresponding to a location across the horizontal axis of the flow stream.

In embodiments, systems are configured to generate frequency-encoded fluorescence data from detected light from the particle in the flow stream. The fluorescence data may be generated from one or more fluorescence light detectors (e.g., one or more detection channels), such as 2 or more, such as 3 or more, such as 4 or more, such as 5 or more, such as 6 or more and including 8 or more fluorescence light detectors (e.g., 8 or more detection channels). In some embodiments, the frequency-encoded fluorescence data includes data components taken (or derived) from light from other detectors, such as detected light absorption or detected light scatter. In some instances, systems are configured to generate one or more data components of the frequency-encoded fluorescence data from light absorption detected from the sample, such as from a brightfield light detector. For example, systems may be configured to generate the phase correction component from signals from a brightfield detector. In certain embodiments, the system is configured to generate a phase-corrected spatial data which accounts for an interferometric phase adjustment to the spatial data calculated from frequency-encoded fluorescence data. In other instances, systems are configured to generate one or more data components of the frequency-encoded fluorescence data from light scatter detected from the sample, such as from a side scatter detector, a forward scatter detector or a combination of a side scatter detector and forward scatter detector.

In embodiments, systems include a processor having memory operably coupled to the processor where the memory includes instructions stored thereon, which when executed by the processor, cause the processor to calculate spatial data from the frequency-encoded fluorescence data. The spatial data according to embodiments of the disclosure is phase-corrected by the system by performing a transform of the frequency-encoded fluorescence data with a phase correction component. In some embodiments, the spatial data includes horizontal size dimensions of the particle, vertical size dimensions of the particle, ratio of particle size along two different dimensions, ratio size of particle components (e.g., the ratio of horizontal dimension of the nucleus to horizontal dimension of the cytoplasm of a cell).

In some embodiments, systems are configured to calculate modified transform coefficients for transforming the frequency-encoded fluorescence data into phase-corrected spatial data. For example, the phase correction component may include 2 or more modified transform coefficients, such as 3 or more, such as 4 or more and including 5 or more modified transform coefficients. Where the spatial data is calculated by performing a Fourier transform, the phase correction component includes modified transform coefficient where the Fourier transform generates only real mathematical computational components (i.e., no imaginary mathematical computation components are generated)

In some instances, systems are configured to determine a phase correction component that includes a first phase adjustment and a second phase adjustment. Each phase adjustment may be a result of a different source of phase in the frequency-encoded fluorescence data. In one example, the first phase adjustment includes an output signal from the light detection system. For example, the first phase adjustment may include an output signal from a brightfield photodetector. In some embodiments, systems include a processor having memory operably coupled to the processor where the memory includes instructions stored thereon, which when executed by the processor, cause the processor to calculate a first phase adjustment by: multiplying an output signal from the brightfield photodetector with a predetermined constant signal to produce a phase adjustment value; and calculating the arctangent of the phase adjustment value to generate the first phase adjustment. In these embodiments, the phase adjustment value is a sum of all bins in a discrete Fourier transform of the frequency-encoded fluorescence data.

In other instances, systems are configured to calculate a second phase adjustment that is based on fluorescence lifetime of a fluorophore in the sample. In these instances, systems are configured to calculate the second phase adjustment by taking the signal from all fluorescence detectors to determine the phases present in the signal and calculate the second phase adjustment from the fluorescence lifetime of the fluorophore. The subject systems may be configured to calculate fluorescence lifetimes using different detector channels, such as by using 2 or more detection channels, such as 3 or more, such as 4 or more and including 5 or more detector channels.

In embodiments, the subject systems include a processor with memory operably coupled to the processor such that the memory includes instructions stored thereon, which when executed by the processor, cause the processor to calculate phased-corrected spatial data of the particle by performing a transform of the frequency-encoded fluorescence data with a phase correction component. In some embodiments, to calculate the phase-corrected spatial data, systems are configured to perform a Fourier transform of the frequency-encoded fluorescence data with the phase correction component to generate the phase-corrected spatial data of the particle. In other embodiments, systems are configured to perform a discrete Fourier transform of the frequency-encoded fluorescence data with the phase correction component to generate the phase-corrected spatial data of the particle. In yet other embodiments, systems are configured to perform a short time Fourier transform (STFT) of the frequency-encoded fluorescence data with the phase correction component. In yet other embodiments, systems are configured to perform a discrete Fourier transform (DFT) of the frequency-encoded fluorescence data with the phase correction component. In still other embodiments, systems are configured to calculate the phase-corrected spatial data with a digital lock-in amplifier to heterodyne and de-multiplex the frequency-encoded fluorescence data.

In some embodiments, systems are configured to take into account the phase correction component before performing a transform of the frequency-encoded data into spatial data so that the output of the transform is less computationally complex as compared to performing a transform of the raw frequency data into spatial data (i.e., without first accounting for phase). In some embodiments, systems are configured to perform a transform of the frequency-encoded fluorescence data without performing any mathematical imaginary computations (i.e., only performing computations for mathematical real computations of the transform) to generate spatial data from the frequency-encoded fluorescence data.

The subject systems may be configured to generate one or more images of a particle in the flow stream from the frequency-encoded fluorescence. In some embodiments, the image of the particle may be generated from the frequency-encoded fluorescence in combination with detected light absorption, detected light scatter or a combination thereof. In certain instances, the image of the particle is generated from only the frequency-encoded fluorescence. In other instances, the image of the object is generated from the frequency-encoded fluorescence and light absorption detected from the sample, such as from a brightfield light detector. In yet other instances, the image of the particle is generated from the frequency-encoded fluorescence with light scatter detected from the sample, such as from a side scatter detector, a forward scatter detector or a combination of a side scatter detector and forward scatter detector. In still other instances, the image of the particle is generated from the frequency-encoded fluorescence and a combination of detected light absorption, detected light scatter and detected light emission.

Systems according to some embodiments, may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low-level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, the processor includes analog electronics which provide feedback control, such as for example negative feedback control.

The system memory may be any of a variety of known or future memory storage devices. Examples include any commonly available random-access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra-Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows 10, Windows NT®, Windows XP, Windows 7, Windows 8, iOS, Sun Solaris, Linux, OS/400, Compaq Tru64 Unix, SGI IRIX, Siemens Reliant Unix, Ubuntu, Zorin OS and others.

In certain embodiments, the subject systems include one or more optical adjustment components for adjusting the light such as light irradiated onto the sample (e.g., from a laser) or light collected from the sample (e.g., fluorescence). For example, the optical adjustment may be to increase the dimensions of the light, the focus of the light or to collimate the light. In some instances, optical adjustment is a magnification protocol so as to increase the dimensions of the light (e.g., beam spot), such as increasing the dimensions by 5% or more, such as by 10% or more, such as by 25% or more, such as by 50% or more and including increasing the dimensions by 75% or more. In other embodiments, optical adjustment includes focusing the light so as to reduce the light dimensions, such as by 5% or greater, such as by 10% or greater, such as by 25% or greater, such as by 50% or greater and including reducing the dimensions of the beam spot by 75% or greater. In certain embodiments, optical adjustment includes collimating the light. The term "collimate" is used in its conventional sense to refer to the optically adjusting the collinearity of light propagation or reducing divergence by the light of from a common axis of propagation. In some instances, collimating includes narrowing the spatial cross section of a light beam (e.g., reducing the beam profile of a laser)

In some embodiments, the optical adjustment component is a focusing lens having a magnification ratio of from 0.1 to 0.95, such as a magnification ratio of from 0.2 to 0.9, such as a magnification ratio of from 0.3 to 0.85, such as a magnification ratio of from 0.35 to 0.8, such as a magnification ratio of from 0.5 to 0.75 and including a magnification ratio of from 0.55 to 0.7, for example a magnification ratio of 0.6. For example, the focusing lens is, in certain instances, a double achromatic de-magnifying lens having a magnification ratio of about 0.6. The focal length of the focusing lens may vary, ranging from 5 mm to 20 mm, such as from 6 mm to 19 mm, such as from 7 mm to 18 mm, such as from 8 mm to 17 mm, such as from 9 mm to 16 and including a focal length ranging from 10 mm to 15 mm. In certain embodiments, the focusing lens has a focal length of about 13 mm.

In other embodiments, the optical adjustment component is a collimator. The collimator may be any convenient collimating protocol, such as one or more mirrors or curved lenses or a combination thereof. For example, the collimator is in certain instances a single collimating lens. In other instances, the collimator is a collimating mirror. In yet other instances, the collimator includes two lenses. In still other instances, the collimator includes a mirror and a lens. Where the collimator includes one or more lenses, the focal length of the collimating lens may vary, ranging from 5 mm to 40 mm, such as from 6 mm to 37.5 mm, such as from 7 mm to 35 mm, such as from 8 mm to 32.5 mm, such as from 9 mm to 30 mm, such as from 10 mm to 27.5 mm, such as from 12.5 mm to 25 mm and including a focal length ranging from 15 mm to 20 mm.

In some embodiments, the subject systems include include a flow cell nozzle having a nozzle orifice configured to flow a flow stream through the flow cell nozzle. The subject flow cell nozzle has an orifice which propagates a fluidic sample to a sample interrogation region, where in some embodiments, the flow cell nozzle includes a proximal cylindrical portion defining a longitudinal axis and a distal frustoconical portion which terminates in a flat surface having the nozzle orifice that is transverse to the longitudinal axis. The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the nozzle chamber does not include a cylindrical portion and the entire flow cell nozzle chamber is frustoconically shaped. In these embodiments, the length of the frustoconical nozzle chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical nozzle chamber may range from 1 mm to 10 mm, such as from 2 mm to 9 mm, such as from 3 mm to 8 mm and including from 4 mm to 7 mm.

In embodiments, the sample flow stream emanates from an orifice at the distal end of the flow cell nozzle. Depending on the desired characteristics of the flow stream, the flow cell nozzle orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell nozzle of interest has a circular orifice. The size of the nozzle orifice may vary, in some embodiments ranging from 1 µm to 20000 µm, such as from 2 µm to 17500 µm, such as from 5 µm to 15000 µm, such as from 10 µm to 12500 µm, such as from 15 µm to 10000 µm, such as from 25 µm to 7500 µm, such as from 50 µm to 5000 µm, such as from 75 µm to 1000 µm, such as from 100 µm to 750 µm and including from 150 µm to 500 µm. In certain embodiments, the nozzle orifice is 100 µm.

In some embodiments, the flow cell nozzle includes a sample injection port configured to provide a sample to the flow cell nozzle. In embodiments, the sample injection system is configured to provide suitable flow of sample to the flow cell nozzle chamber. Depending on the desired characteristics of the flow stream, the rate of sample conveyed to the flow cell nozzle chamber by the sample injection port may be 1 µL/sec or more, such as 2 µL/sec or more, such as 3 µL/sec or more, such as 5 µL/sec or more, such as 10 μL/sec or more, such as 15 μL/sec or more, such as 25 μL/sec or more, such as 50 μL/sec or more, such as 100 μL/sec or more, such as 150 μL/sec or more, such as 200 μL/sec or more, such as 250 μL/sec or more, such as 300 μL/sec or more, such as 350 μL/sec or more, such as 400 μL/sec or more, such as 450 μL/sec or more and including 500 μL/sec or more. For example, the sample flow rate may range from 1 μL/sec to about 500 μL/sec, such as from 2 μL/sec to about 450 μL/sec, such as from 3 μL/sec to about 400 μL/sec, such as from 4 μL/sec to about 350 μL/sec, such as from 5 μL/sec to about 300 μL/sec, such as from 6 μL/sec to about 250 μL/sec, such as from 7 μL/sec to about 200 μL/sec, such as from 8 μL/sec to about 150 μL/sec, such as from 9 μL/sec to about 125 μL/sec and including from 10 μL/sec to about 100 μL/sec.

The sample injection port may be an orifice positioned in a wall of the nozzle chamber or may be a conduit positioned at the proximal end of the nozzle chamber. Where the sample injection port is an orifice positioned in a wall of the nozzle chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell nozzle chamber. For example, the sample injection port may be a conduit positioned to have the orifice of the sample injection port in line with the flow cell nozzle orifice. Where the sample injection port is a conduit positioned in line with the flow cell nozzle orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell nozzle also includes a sheath fluid injection port configured to provide a sheath fluid to the flow cell nozzle. In embodiments, the sheath fluid injection system is configured to provide a flow of sheath fluid to the flow cell nozzle chamber, for example in conjunction with the sample to produce a laminated flow stream of sheath fluid surrounding the sample flow stream. Depending on the desired characteristics of the flow stream, the rate of sheath fluid conveyed to the flow cell nozzle chamber by the may be 25 μL/sec or more, such as 50 μL/sec or more, such as 75 μL/sec or more, such as 100 μL/sec or more, such as 250 μL/sec or more, such as 500 μL/sec or more, such as 750 μL/sec or more, such as 1000 μL/sec or more and including 2500 μL/sec or more. For example, the sheath fluid flow rate may range from 1 μL/sec to about 500 μL/sec, such as from 2 μL/sec to about 450 μL/sec, such as from 3 μL/sec to about 400 μL/sec, such as from 4 μL/sec to about 350 μL/sec, such as from 5 μL/sec to about 300 μL/sec, such as from 6 μL/sec to about 250 μL/sec, such as from 7 μL/sec to about 200 μL/sec, such as from 8 μL/sec to about 150 μL/sec, such as from 9 μL/sec to about 125 μL/sec and including from 10 μL/sec to about 100 μL/sec.

In some embodiments, the sheath fluid injection port is an orifice positioned in a wall of the nozzle chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

The subject systems, in certain instances, include a sample interrogation region in fluid communication with the flow cell nozzle orifice. In these instances, a sample flow stream emanates from an orifice at the distal end of the flow cell nozzle and particles in the flow stream may be irradiated with a light source at the sample interrogation region. The size of the interrogation region may vary depending on the properties of the flow nozzle, such as the size of the nozzle orifice and sample injection port size. In embodiments, the interrogation region may have a width that is 0.01 mm or more, such as 0.05 mm or more, such as 0.1 mm or more, such as 0.5 mm or more, such as 1 mm or more, such as 2 mm or more, such as 3 mm or more, such as 5 mm or more and including 10 mm or more. The length of the interrogation region may also vary, ranging in some instances along 0.01 mm or more, such as 0.1 mm or more, such as 0.5 mm or more, such as 1 mm or more, such as 1.5 mm or more, such as 2 mm or more, such as 3 mm or more, such as 5 mm or more, such as 10 or more, such as 15 mm or more, such as 20 mm or more, such as 25 mm or more and including 50 mm or more.

The interrogation region may be configured to facilitate irradiation of a planar cross-section of an emanating flow stream or may be configured to facilitate irradiation of a diffuse field (e.g., with a diffuse laser or lamp) of a predetermined length. In some embodiments, the interrogation region includes a transparent window that facilitates irradiation of a predetermined length of an emanating flow stream, such as 1 mm or more, such as 2 mm or more, such as 3 mm or more, such as 4 mm or more, such as 5 mm or more and including 10 mm or more. Depending on the light source used to irradiate the emanating flow stream (as described below), the interrogation region may be configured to pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm. As such, the interrogation region may be formed from any transparent material which passes the desired range of wavelength, including but not limited to optical glass, borosilicate glass, Pyrex glass, ultraviolet quartz, infrared quartz, sapphire as well as plastic, such as polycarbonates, polyvinyl chloride (PVC), polyurethanes, polyethers, polyamides, polyimides, or copolymers of these thermoplastics, such as PETG (glycol-modified polyethylene terephthalate), among other polymeric plastic materials, including polyester, where polyesters of interest may include, but are not limited to poly(alkylene terephthalates) such as poly(ethylene terephthalate) (PET), bottle-grade PET (a copolymer made based on monoethylene glycol, terephthalic acid, and other comonomers such as isophthalic acid, cyclohexene dimethanol, etc.), poly(butylene terephthalate) (PBT), and poly(hexamethylene terephthalate); poly(alkylene adipates) such as poly(ethylene adipate), poly(1,4-butylene adipate), and poly(hexamethylene adipate); poly(alkylene suberates) such as poly(ethylene suberate); poly(alkylene sebacates) such as poly(ethylene sebacate); poly(ε-caprolactone) and poly(β-propiolactone); poly(alkylene isophthalates) such as poly(ethylene isophthalate); poly(alkylene 2,6-naphthalene-dicarboxylates) such as poly(ethylene 2,6-naphthalene-dicarboxylate); poly(alkylene sulfonyl-4,4'-dibenzoates) such as poly(ethylene sulfonyl-4,4'-dibenzoate); poly(p-phenylene alkylene dicarboxylates) such as poly(p-phenylene ethylene dicarboxylates); poly(trans-1,4-cyclohexanediyl alkylene dicarboxylates) such as poly(trans-1,4-cyclohexanediyl ethylene dicarboxylate); poly(1,4-cyclohexane-dimethylene alkylene dicarboxylates) such as poly(1,4-cyclohexane-dimethylene ethylene dicarboxylate); poly([2.2.2]-bicyclooctane-1,4-dimethylene alkylene dicarboxylates) such as poly([2.2.2]-bicyclooctane-1,4-dimethylene ethylene dicarboxylate); lactic acid polymers and copolymers such as (S)-polylactide, (R,S)-polylactide, poly(tetramethylglycolide), and poly(lactide-co-glycolide); and polycarbonates of bisphenol A, 3,3'-dimethylbisphenol A, 3,3',5,5'-tetrachlorobisphenol A, 3,3',5,5'-tetramethylbisphenol A; polyamides such as poly(p-phenylene terephthalamide); polyesters, e.g., polyethylene terephthalates, e.g., Mylar™ polyethylene terephthalate; etc. In some embodiments, the subject systems include a cuvette positioned in the sample interrogation region. In embodiments, the cuvette may pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm.

In some embodiments, the subject systems include a particle sorting component for sorting particles (e.g., cells) of the sample. In certain instances, the particle sorting component is a particle sorting module such as those described in U.S. Patent Publication No. 2017/0299493, filed on Mar. 28, 2017 and U.S. Provisional Patent Application No. 62/752,793 filed on Oct. 30, 2018, the disclosures of which is incorporated herein by reference. In certain embodiments, the particle sorting component include one or more droplet deflectors such as those described in U.S. Patent Publication No. 2018/0095022, filed on Jun. 14, 2017, the disclosure of which is incorporated herein by reference.

In some embodiments, the subject systems are flow cytometric systems. Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49(pt 1):17-28; Linden, et. al., Semin Throm Hemost. 2004 October; 30(5):502-11; Alison, et al. J Pathol, 2010 December; 222(4):335-344; and Herbig, et al. (2007) *Crit Rev Ther Drug Carrier Syst*. 24(3):203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSRFortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

In some embodiments, the subject particle sorting systems are flow cytometric systems, such those described in U.S. Pat. Nos. 10,006,852; 9,952,076; 9,933,341; 9,784,661; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosure of which are herein incorporated by reference in their entirety.

In certain instances, the subject systems are flow cytometry systems configured for characterizing and imaging particles in a flow stream by fluorescence imaging using radiofrequency tagged emission (FIRE), such as those described in Diebold, et al. *Nature Photonics* Vol. 7(10); 806-810 (2013) as well as described in U.S. Pat. Nos. 9,423,353; 9,784,661 and 10,006,852 and U.S. Patent Publication Nos. 2017/0133857 and 2017/0350803, the disclosures of which are herein incorporated by reference.

Integrated Circuit Devices

Aspects of the present disclosure also include integrated circuit devices programmed to: generate frequency-encoded fluorescence data from a particle in the flow stream; calculate phase-corrected spatial data of the particle by performing a transform of the frequency-encoded fluorescence data with a phase correction component. In some embodiments, integrated circuit devices are programmed to sort the particles, such as to a sample collection container or to a waste collection container. Integrated circuit devices of interest may include, in certain instances, a field programmable gate array (FPGA), an application specific integrated circuit (ASIC) or a complex programmable logic device (CPLD).

In embodiments, the integrated circuit device is programmed to generate frequency-encoded fluorescence data. The fluorescence data may be generated from one or more fluorescence light detectors (e.g., one or more detection channels), such as 2 or more, such as 3 or more, such as 4 or more, such as 5 or more, such as 6 or more and including 8 or more fluorescence light detectors (e.g., 8 or more detection channels). In some embodiments, the frequency-encoded fluorescence data includes data components taken (or derived) from light from other detectors, such as detected light absorption or detected light scatter. In some instances, systems are configured to generate one or more data components of the frequency-encoded fluorescence data from light absorption detected from the sample, such as from a brightfield light detector. For example, systems may be configured to generate the phase correction component from signals from a brightfield detector. In certain embodiments, the system is configured to generate a phase-corrected spatial data which accounts for an interferometric phase adjustment to the spatial data calculated from frequency-encoded fluorescence data. In other instances, systems are configured to generate one or more data components of the frequency-encoded fluorescence data from light scatter detected from the sample, such as from a side scatter detector, a forward scatter detector or a combination of a side scatter detector and forward scatter detector.

In embodiments, the subject integrated circuit devices are programmed to calculate spatial data from the frequency-encoded fluorescence data. The spatial data according to embodiments of the disclosure is phase-corrected by performing a transform of the frequency-encoded fluorescence data with a phase correction component. In some embodiments, the spatial data includes horizontal size dimensions of the particle, vertical size dimensions of the particle, ratio of particle size along two different dimensions, ratio size of particle components (e.g., the ratio of horizontal dimension of the nucleus to horizontal dimension of the cytoplasm of a cell).

In some embodiments, the integrated circuit devices are programmed to calculate modified transform coefficients for transforming the frequency-encoded fluorescence data into phase-corrected spatial data. For example, the phase correction component may include 2 or more modified transform coefficients, such as 3 or more, such as 4 or more and including 5 or more modified transform coefficients. Where the spatial data is calculated by performing a Fourier transform, the phase correction component may include modified transform coefficient where the Fourier transform generates only real mathematical computational components (i.e., no imaginary mathematical computation components are generated)

In some instances, the integrated circuit devices are programmed to determine a phase correction component that includes a first phase adjustment and a second phase adjustment. Each phase adjustment may be a result of a different source of phase in the frequency-encoded fluorescence data. In one example, the first phase adjustment includes an output signal from the light detection system. For example, the integrated circuit devices may be programmed determine a first phase adjustment based on an output signal from a brightfield photodetector. In some embodiments the integrated circuit devices are programmed to calculate a first phase adjustment by: multiplying an output signal from the brightfield photodetector with a predetermined constant signal to produce a phase adjustment value; and calculating the arctangent of the phase adjustment value to generate the first phase adjustment. In these embodiments, the phase adjustment value is a sum of all bins in a discrete Fourier transform of the frequency-encoded fluorescence data.

In other instances, the integrated circuit devices are programmed to calculate a second phase adjustment that is based on fluorescence lifetime of a fluorophore in the sample. In these instances, the integrated circuit devices are programmed to calculate the second phase adjustment by taking the signal from all fluorescence detectors to determine the phases present in the signal and calculate the second phase adjustment from the fluorescence lifetime of the fluorophore. The subject integrated circuit devices may be programmed to calculate fluorescence lifetimes using different detector channels, such as by using 2 or more detection channels, such as 3 or more, such as 4 or more and including 5 or more detector channels.

In embodiments, the subject integrated circuit devices are programmed to calculate phased-corrected spatial data of the particle by performing a transform of the frequency-encoded fluorescence data with a phase correction component. In some embodiments, to calculate the phase-corrected spatial data, systems are configured to perform a Fourier transform of the frequency-encoded fluorescence data with the phase correction component to generate the phase-corrected spatial data of the particle. In other embodiments, integrated circuit devices are programmed to perform a discrete Fourier transform of the frequency-encoded fluorescence data with the phase correction component to generate the phase-corrected spatial data of the particle. In yet other embodiments, integrated circuit devices are programmed to perform a short time Fourier transform (STFT) of the frequency-encoded fluorescence data with the phase correction component. In yet other embodiments, integrated circuit devices are programmed to perform a discrete Fourier transform (DFT) of the frequency-encoded fluorescence data with the phase correction component. In still other embodiments, integrated circuit devices are programmed to calculate the phase-corrected spatial data with a digital lock-in amplifier to heterodyne and de-multiplex the frequency-encoded fluorescence data.

In certain embodiments, the integrated circuit device is programmed to make a sorting decision (as described above) based on the frequency-encoded fluorescence data, the calculated spatial data, generated image, one or more determined properties of the particle (e.g., size, center of mass, eccentricity) determined from the calculated spatial data or the generated image or some combination thereof. In these embodiments, analysis includes classifying and counting particles such that each particle is present as a set of digitized parameter values. The subject integrated circuit device may be programmed to trigger a sorting component based on a selected parameter in order to distinguish the particles of interest from background and noise.

Kits

Aspects of the present disclosure further include kits, where kits include one or more of the integrated circuit devices described herein. In some embodiments, kits may further include programming for the subject systems, such as in the form of a computer readable medium (e.g., flash drive, USB storage, compact disk, DVD, Blu-ray disk, etc.) or instructions for downloading the programming from an internet web protocol or cloud server. Kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject systems, methods and computer systems find use in a variety of applications where it is desirable to analyze and sort particle components in a sample in a fluid medium, such as a biological sample. In some embodiments, the systems and methods described herein find use in flow cytometry characterization of biological samples labelled with fluorescent tags. In other embodiments, the systems and methods find use in spectroscopy of emitted light. In addition, the subject systems and methods find use in increasing the obtainable signal from light collected from a sample (e.g., in a flow stream). Embodiments of the present disclosure find use where it is desirable to provide a flow cytometer with improved cell sorting accuracy, enhanced particle collection, particle charging efficiency, more accurate particle charging and enhanced particle deflection during cell sorting.

Embodiments of the present disclosure also find use in applications where cells prepared from a biological sample may be desired for research, laboratory testing or for use in therapy. In some embodiments, the subject methods and devices may facilitate obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems may facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Notwithstanding the appended claims, the disclosure is also defined by the following clauses:

1. A method comprising:
   generating frequency-encoded fluorescence data from a particle of a sample in a flow stream; and
   calculating phase-corrected spatial data of the particle by performing a transform of the frequency-encoded fluorescence data with a phase correction component.
2. The method according to clause 1, wherein the spatial data is calculated by performing a Fourier transform of the frequency-encoded fluorescence data with the phase correction component.
3. The method according to clause 2, wherein the spatial data is calculated by performing a discrete Fourier transform of the frequency-encoded fluorescence data with the phase correction component.
4. The method according to clause 2, wherein the spatial data is calculated by performing a short time Fourier transform (STFT) of the frequency-encoded fluorescence data with the phase correction component.
5. The method according to clause 1, wherein the spatial data is calculated with a digital lock-in amplifier to heterodyne and de-multiplex the frequency-encoded fluorescence data.
6. The method according to any one of clauses 1-5, wherein the phase correction component comprises modified transform coefficients that are used to transform the frequency-encoded fluorescence data into the phase-corrected spatial data.
7. The method according to any one of clauses 1-6, wherein generating the frequency-encoded fluorescence data from the particle comprises detecting light from the particle in the sample with a light detection system.
8. The method according to clause 7, wherein the light detected from the particle comprises light absorption, light scatter, emitted light or a combination thereof.
9. The method according to clause 8, wherein light absorption is detected with a brightfield photodetector.
10. The method according to any one of clauses 8-9, wherein emitted light is detected with a fluorescence detector.
11. The method according to any one of clauses 1-10, wherein the phase correction component comprises a first phase adjustment and a second phase adjustment.
12. The method according to clause 11, wherein the first phase adjustment comprises an output signal from the light detection system.
13. The method according to clause 12, wherein the first phase adjustment comprises an output signal from a brightfield photodetector.
14. The method according to clause 13, further comprising calculating the first phase adjustment by:
   multiplying an output signal from the brightfield photodetector with a predetermined constant signal to produce a phase adjustment value; and calculating the arctangent of the phase adjustment value to generate the first phase adjustment.
15. The method according to clause 14, wherein the phase adjustment value is a sum of all bins in a discrete Fourier transform of the frequency-encoded fluorescence data.
16. The method according to any one of clauses 11-15, wherein the first phase adjustment is an interferometric phase adjustment.
17. The method according to clause 16, wherein the interferometric phase adjustment comprises a phase shift from a light source configured to irradiate the sample in the flow stream.
18. The method according to clause 17, wherein the light source comprises a light beam generator component configured to generate at least a first beam of frequency shifted light and a second beam of frequency shifted light.
19. The method according to clause 18, wherein the light beam generator comprises an acousto-optic deflector.
20. The method according to any one clauses 18-19, wherein the light beam generator comprises a direct digital synthesizer (DDS) RF comb generator.
21. The method according to any one of clauses 18-20, wherein the light beam generator component is configured to generate a frequency-shifted local oscillator beam.
22. The method according to any one of clauses 17-21, wherein the light source comprises a laser.
23. The method according to clause 22, wherein the laser is a continuous wave laser.
24. The method according to any one of clauses 17-23, wherein the interferometric phase adjustment comprises a phase shift resulting from vibrations between components of the light source.
25. The method according to any one of clauses 11-24, further comprising calculating the second phase adjustment based on a fluorescence lifetime of a fluorophore in the sample.
26. The method according to any one of clauses 1-25, wherein the phase-corrected spatial data of the particle is calculated from the frequency-encoded fluorescence data by an integrated circuit device.
27. The method according to clause 26, wherein the integrated circuit device is a field programmable gate array (FPGA).
28. The method according to clause 26, wherein the integrated circuit device is an application specific integrated circuit (ASIC).
29. The method according to clause 26, wherein the integrated circuit device is a complex programmable logic device (CPLD).

30. The method according to any one of clauses 1-29, further comprising irradiating the flow stream with a light source.
31. The method according to clause 30, wherein the flow stream is irradiated with a light source at a wavelength from 200 nm to 800 nm.
32. The method according to any one of clauses 30-31, wherein the method comprises irradiating the flow stream with a first beam of frequency shifted light and second beam of frequency shifted light.
33. The method according to clause 32, wherein the first beam of frequency shifted light comprises a local oscillator (LO) beam and the second beam of frequency shifted light comprises a radiofrequency comb beam.
34. The method according to any one of clauses 32-33, further comprising:
 applying a radiofrequency drive signal to an acousto-optic device; and
 irradiating the acousto-optic device with a laser to generate the first beam of frequency shifted light and the second beam of frequency shifted light.
35. The method according to clause 34, wherein the laser is a continuous wave laser.
36. The method according to any one of clauses 1-35, further comprising generating an image of the particle from the phase-corrected spatial data.
37. The method according to clause 36, further comprising generating an image mask of the particle.
38. The method according to any one of clauses 1-37, further comprising sorting the particle.
39. A system comprising:
 a light source configured to irradiate a sample comprising particles in a flow stream;
 a light detection system; and
 a processor comprising memory operably coupled to the processor wherein the memory comprises instructions stored thereon, which when executed by the processor, cause the processor to:
  generate frequency-encoded fluorescence data from a particle in the flow stream;
  calculate phased-corrected spatial data of the particle by performing a transform of the frequency-encoded fluorescence data with a phase correction component.
40. The system according to clause 39, wherein the memory comprises instructions stored thereon, which when executed by the processor, cause the processor to perform a Fourier transform of the frequency-encoded fluorescence data with the phase correction component to generate the phase-corrected spatial data of the particle.
41. The system according to clause 40, wherein the memory comprises instructions stored thereon, which when executed by the processor, cause the processor to perform a discrete Fourier transform of the frequency-encoded fluorescence data with the phase correction component to generate the phase-corrected spatial data of the particle.
42. The system according to clause 40, wherein the memory comprises instructions stored thereon, which when executed by the processor, cause the processor to perform a short time Fourier transform (STFT) of the frequency-encoded fluorescence data with the phase correction component.
43. The system according to clause 40, wherein the memory comprises instructions stored thereon, which when executed by the processor, cause the processor to calculate the phase-corrected spatial data with a digital lock-in amplifier to heterodyne and de-multiplex the frequency-encoded fluorescence data.
44. The system according to any one of clauses 39-43, wherein the memory comprises instructions stored thereon, which when executed by the processor, cause the processor to transform the frequency-encoded fluorescence data into the spatial data with a phase correction component that comprises modified transform coefficients.
45. The system according to any one of clauses 39-44, wherein the light detection system comprises a photodetector configured to detect one or more of light absorption, light scatter and fluorescence.
46. The system according to clause 45, wherein the light detection system comprises a brightfield photodetector.
47. The system according to any one of clauses 39-46, wherein the light detection system comprises a fluorescence detector.
48. The system according to any one of clauses 44-47, wherein the memory comprises instructions stored thereon, which when executed by the processor, cause the processor to calculate a phase correction component that comprises a first phase adjustment and a second phase adjustment.
49. The system according to clause 48, wherein the memory comprises instructions stored thereon, which when executed by the processor, cause the processor to calculate the first phase adjustment by:
 multiplying an output signal from the brightfield photo photodetector with a predetermined constant signal to produce a phase adjustment value; and
 calculating the arctangent of the phase adjustment value to generate the first phase adjustment.
50. The system according to clause 49, wherein the phase adjustment value is a sum of all bins in a discrete Fourier transform of the frequency-encoded fluorescence data.
51. The system according to any one of clauses 48-50, wherein the first phase adjustment is an interferometric phase adjustment.
52. The system according to clause 51, wherein the interferometric phase adjustment comprises a phase shift from the light source.
53. The system according to any one of clauses 39-52, wherein the light source comprises a light beam generator component configured to generate at least a first beam of frequency shifted light and a second beam of frequency shifted light.
54. The system according to clause 53, wherein the light beam generator comprises an acousto-optic deflector.
55. The system according to any one clauses 53-54, wherein the light beam generator comprises a direct digital synthesizer (DDS) RF comb generator.
56. The system according to any one of clauses 53-55, wherein the light beam generator component is configured to generate a frequency-shifted local oscillator beam.
57. The system according to any one of clauses 39-56, wherein the light source comprises a laser.
58. The system according to clause 57, wherein the laser is a continuous wave laser.
59. The system according to any one of clauses 51-58, wherein the interferometric phase adjustment comprises a phase shift resulting from vibrations between components of the light source.

60. The system according to any one of clauses 39-59, wherein the memory comprises instructions stored thereon, which when executed by the processor, cause the processor to calculate the second phase adjustment based on a fluorescence lifetime of a fluorophore in the sample.

61. The system according to any one of clauses 39-60, comprising an integrated circuit component programmed for:
generating the frequency-encoded fluorescence data from the particle of a sample in the flow stream;
calculating phase-corrected spatial data of the particle by performing a transform of the frequency-encoded fluorescence data with a phase correction component.

62. The system according to clause 61, wherein the integrated circuit device is a field programmable gate array (FPGA).

63. The system according to clause 61, wherein the integrated circuit device is an application specific integrated circuit (ASIC).

64. The system according to clause 61, wherein the integrated circuit device is a complex programmable logic device (CPLD).

65. The system according to any one of clauses 39-64, wherein the system is a flow cytometer.

66. The system according to any one of clauses 39-65, wherein the memory comprises instructions stored thereon, which when executed by the processor, cause the processor to generate an image of the particle from the phase-corrected spatial data.

67. The system according to clause 66, wherein the memory comprises instructions stored thereon, which when executed by the processor, cause the processor to generate an image mask of the particle.

68. The system according to any one of clauses 39-67, further comprising a cell sorting component configured to sort cells in the sample based on the calculated phase-corrected spatial data.

69. The system according to clause 68, wherein the cell sorting component comprises a droplet deflector.

70. An integrated circuit programmed to:
generate frequency-encoded fluorescence data from a particle in the flow stream;
calculate phase-corrected spatial data of the particle by performing a transform of the frequency-encoded fluorescence data with a phase correction component.

71. The integrated circuit according to clause 70, wherein the integrated circuit is programmed to perform a Fourier transform of the frequency-encoded fluorescence data with the phase correction component to generate the phase-corrected spatial data of the particle.

72. The integrated circuit according to clause 71, wherein the integrated circuit is programmed to perform a discrete Fourier transform of the frequency-encoded fluorescence data with the phase correction component to generate the phase-corrected spatial data of the particle.

73. The integrated circuit according to clause 71, wherein the integrated circuit is programmed to perform a short time Fourier transform of the frequency-encoded fluorescence data with the phase correction component to generate the phase-corrected spatial data of the particle.

74. The integrated circuit according to clause 70, wherein the integrated circuit is programmed to calculate the phase-corrected spatial data with a digital lock-in amplifier to heterodyne and de-multiplex the frequency-encoded fluorescence data.

75. The integrated circuit according any one of clauses 70-74, wherein the integrated circuit is programmed to transform the frequency-encoded fluorescence data into the spatial data with a phase correction component that comprises modified transform coefficients.

76. The integrated circuit according any one of clauses 70-75, wherein the integrated circuit is programmed to calculate a phase correction component that comprises a first phase adjustment and a second phase adjustment.

77. The integrated circuit according clause 76, wherein the integrated circuit is programmed to calculate the first phase adjustment by:
multiplying an output signal from the brightfield photo photodetector with a predetermined constant signal to produce a phase adjustment value; and
calculating the arctangent of the phase adjustment value to generate the first phase adjustment.

78. The integrated circuit according to clause 77, wherein the phase adjustment value is a sum of all bins in a discrete Fourier transform of the frequency-encoded fluorescence data.

79. The integrated circuit according to any one of clauses 76-78, wherein the first phase adjustment is an interferometric phase adjustment.

80. The integrated circuit according to clause 79, wherein the interferometric phase adjustment comprises a phase shift from a light source configured to irradiate the sample in the flow stream.

81. The integrated circuit according to clause 80, wherein the light source comprises a light beam generator component configured to generate at least a first beam of frequency shifted light and a second beam of frequency shifted light.

82. The integrated circuit according to clause 81, wherein the light beam generator comprises an acousto-optic deflector.

83. The integrated circuit according to any one clauses 81-82, wherein the light beam generator comprises a direct digital synthesizer (DDS) RF comb generator.

84. The integrated circuit according to any one of clauses 81-83, wherein the light beam generator component is configured to generate a frequency-shifted local oscillator beam.

85. The integrated circuit according to any one of clauses 80-84, wherein the interferometric phase adjustment comprises a phase shift resulting from vibrations between components of the light source.

86. The integrated circuit according to any one of clauses 76-85, wherein the integrated circuit is programmed to calculate the second phase adjustment based on a fluorescence lifetime of a fluorophore in the sample.

87. The integrated circuit according to any one of clauses 69-86, wherein the integrated circuit is a field programmable gate array (FPGA).

88. The integrated circuit according to any one of clauses 69-86, wherein the integrated circuit device is an application specific integrated circuit (ASIC).

89. The integrated circuit according to clause 69-86, wherein the integrated circuit device is a complex programmable logic device (CPLD).

90. The integrated circuit according to any one of clauses 69-89, wherein the integrated circuit is programmed to generate an image of the particle from the phase-corrected spatial data.

91. The integrated circuit according to clause 90, wherein the integrated circuit is programmed to generate an image mask of the particle.
92. The integrated circuit according to any one of clauses 69-91, wherein the integrated circuit is programmed to generate a sorting decision based on the phase-corrected spatial data.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:
1. A system comprising:
a light source configured to irradiate a sample comprising particles in a flow stream;
a light detection system; and
a processor comprising memory operably coupled to the processor wherein the memory comprises instructions stored thereon, which when executed by the processor, cause the processor to:
generate frequency-encoded fluorescence data from a particle in the flow stream; and
calculate phased-corrected spatial data of the particle by performing a transform of the frequency-encoded fluorescence data with a phase correction component.
2. The system according to claim 1, wherein the memory comprises instructions stored thereon, which when executed by the processor, cause the processor to perform a Fourier transform of the frequency-encoded fluorescence data with the phase correction component to generate the phase-corrected spatial data of the particle.
3. The system according to claim 2, wherein the memory comprises instructions stored thereon, which when executed by the processor, cause the processor to perform a discrete Fourier transform of the frequency-encoded fluorescence data with the phase correction component to generate the phase-corrected spatial data of the particle.
4. The system according to claim 2, wherein the memory comprises instructions stored thereon, which when executed by the processor, cause the processor to perform a short time Fourier transform (STFT) of the frequency-encoded fluorescence data with the phase correction component.
5. The system according to claim 2, wherein the memory comprises instructions stored thereon, which when executed by the processor, cause the processor to calculate the phase-corrected spatial data with a digital lock-in amplifier to heterodyne and de-multiplex the frequency-encoded fluorescence data.
6. The system according to claim 1, wherein the memory comprises instructions stored thereon, which when executed by the processor, cause the processor to transform the frequency-encoded fluorescence data into the spatial data with a phase correction component that comprises modified transform coefficients.
7. The system according to claim 6, wherein the memory comprises instructions stored thereon, which when executed by the processor, cause the processor to calculate a phase correction component that comprises a first phase adjustment and a second phase adjustment.
8. The system according to claim 7, wherein the memory comprises instructions stored thereon, which when executed by the processor, cause the processor to calculate the first phase adjustment by:
multiplying an output signal from a brightfield photo photodetector with a predetermined constant signal to produce a phase adjustment value; and
calculating the arctangent of the phase adjustment value to generate the first phase adjustment.
9. The system according to claim 8, wherein the phase adjustment value is a sum of all bins in a discrete Fourier transform of the frequency-encoded fluorescence data.
10. The system according to claim 7, wherein the first phase adjustment is an interferometric phase adjustment.
11. The system according to claim 1, wherein the light detection system comprises a photodetector configured to detect one or more of light absorption, light scatter and fluorescence.
12. The system according to claim 11, wherein the light detection system comprises a brightfield photodetector.
13. The system according to claim 1, wherein the light detection system comprises a fluorescence detector.
14. The system according to claim 1, wherein the memory comprises instructions stored thereon, which when executed by the processor, cause the processor to calculate the second phase adjustment based on a fluorescence lifetime of a fluorophore in the sample.
15. The system according to claim 1, wherein the system is a flow cytometer.
16. The system according to claim 1, wherein the memory comprises instructions stored thereon, which when executed by the processor, cause the processor to generate an image of the particle from the phase-corrected spatial data.
17. The system according to claim 16, wherein the memory comprises instructions stored thereon, which when executed by the processor, cause the processor to generate an image mask of the particle.

18. The system according to claim 1, further comprising a cell sorting component configured to sort cells in the sample based on the calculated phase-corrected spatial data.

19. The system according to claim 18, wherein the cell sorting component comprises a droplet deflector.

20. A system comprising:
a light source configured to irradiate a sample comprising particles in a flow stream;
a light detection system; and
an integrated circuit component programmed for:
generating the frequency-encoded fluorescence data from the particle of a sample in the flow stream; and
calculating phase-corrected spatial data of the particle by performing a transform of the frequency-encoded fluorescence data with a phase correction component.

* * * * *